(12) United States Patent
Tomizawa

(10) Patent No.: US 7,308,433 B1
(45) Date of Patent: Dec. 11, 2007

(54) APPLICATION MANAGING METHOD AND INFORMATION PROCESSING APPARATUS USING THE METHOD

(75) Inventor: Kazuhiro Tomizawa, Gunma (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/122,740

(22) Filed: Jul. 27, 1998

(30) Foreign Application Priority Data

Jan. 23, 1998 (JP) ................................. 10-011689

(51) Int. Cl.
*G06F 17/30* (2006.01)
(52) U.S. Cl. .................... 707/1; 707/101; 707/200; 711/154; 718/100
(58) Field of Classification Search .............. 707/1–10, 707/100–104.1, 200–206; 711/709, 111–117, 711/1, 108, 200, 205, 207, 154; 713/163, 713/165, 200; 709/212, 213, 215, 216; 718/100

See application file for complete search history.

(56) References Cited

U.S. PATENT DOCUMENTS

| | | | |
|---|---|---|---|
| 5,226,145 A * | 7/1993 | Moronaga et al. ........... 711/202 |
| 5,276,903 A * | 1/1994 | Shinagawa .................... 712/37 |
| 5,423,034 A * | 6/1995 | Cohen-Levy et al. ......... 707/10 |
| 5,584,022 A * | 12/1996 | Kikuchi et al. ................. 707/9 |
| 5,590,306 A * | 12/1996 | Watanabe et al. ............ 711/115 |
| 5,635,703 A * | 6/1997 | Tanaka ........................ 235/492 |
| 5,661,800 A * | 8/1997 | Nakashima et al. ......... 713/200 |
| 5,778,392 A * | 7/1998 | Stockman et al. ........... 707/205 |
| 5,845,069 A * | 12/1998 | Tanaka ........................ 713/200 |
| 5,918,229 A * | 6/1999 | Davis et al. ................... 707/10 |
| 5,930,825 A * | 7/1999 | Nakashima et al. ......... 711/183 |
| 6,449,607 B1 * | 9/2002 | Tomita et al. .................. 707/3 |

FOREIGN PATENT DOCUMENTS

| | | |
|---|---|---|
| EP | 0 292 248 | 11/1988 |
| EP | 0 540 095 | 5/1993 |
| EP | 0 565 389 | 10/1993 |
| EP | 0 583 006 | 2/1994 |
| FR | 2 612 316 | 9/1988 |
| FR | 2 626 696 | 8/1989 |
| FR | 2 635 886 | 3/1990 |
| FR | 2 693 008 | 12/1993 |

(Continued)

OTHER PUBLICATIONS

Olin H. Bray, Data management requirements: The similarity of memory management, database systems, and message processing, 1977, ACM, 68-76.*

(Continued)

*Primary Examiner*—Jean Bolte Fleurantin
(74) *Attorney, Agent, or Firm*—Stass & Halsey LLP

(57) ABSTRACT

A directory structure corresponding to a plurality of applications is formed. Items of identification information are given to predetermined directories of the directory structure, respectively, the items of identification information being used for identifying the plurality of applications, respectively, the plurality of applications corresponding to the predetermined directories, respectively. Management is performed so that an application of the plurality of applications corresponding to a directory of the predetermined directories is selected in accordance with an item of the items of identification information given to the directory of the predetermined directories, when the directory of the predetermined directories is selected.

10 Claims, 18 Drawing Sheets

FOREIGN PATENT DOCUMENTS

| | | |
|---|---|---|
| JP | 63-266698 | 11/1988 |
| JP | 64-29051 | 1/1989 |
| JP | 64-31285 | 2/1989 |
| JP | 02-287739 | 11/1990 |
| JP | 4-255089 | 9/1992 |
| JP | 5-11987 | 1/1993 |
| JP | 05-011987 | 1/1993 |
| JP | 6-348556 | 12/1994 |
| JP | 07-262001 | * 10/1995 |
| JP | 10-011349 | 1/1998 |

OTHER PUBLICATIONS

Matthew Haines et al., SmartFiles: An OO Approach to Data File Interoperability, 1995, ACM, 453-466.*

Japanese language Official Action against corresponding Japanese Patent Application No. 10-011689 (mailed Oct. 12, 2004).

Japanese Office Action, which was mailed on Mar. 9, 2004, in corresponding Japanese Patent Application No. 10-011689.

* cited by examiner

APPLICATION MANAGEMENT TABLE

| NUMBER | APPLICATION ADDRESS |
|--------|---------------------|
| #0     | adr 0               |
| ...    | ...                 |
| #n     | adr n               |

APPLICATION MANAGING METHOD AND INFORMATION PROCESSING APPARATUS USING THE METHOD

BACKGROUND OF THE INVENTION

The present invention relates to an application managing method, and an information processing apparatus using the method, and, in particular, to an application managing method, and an information processing apparatus using the method, used when a plurality of applications are stored.

Recently, card-type recording media having IC chips built therein, that is, IC cards, such as electronic money, credit cards, cards for self-governing bodies and so forth, have been used.

Such an IC card has a large storage capacity, and, demands that one card is to be used for a plurality of types of business have been increasing.

For example, in a case where an IC card is used as a credit card, and an IC card is used as a card for a self-governing body, it is convenient for a user that a single IC card is used commonly as a credit card and as a card for the self-governing body, instead of two IC cards for respective uses being possessed. Therefore, an IC card in which a plurality of applications are used is needed.

DESCRIPTIONS OF THE RELATED ART

In the related art, an operation parameter is stored in an IC card, and an operation of a host computer is changed as a result of the operation parameter being supplied to the host computer, which parameter is stored in the IC card, when the IC card is inserted into a IC card reader/writer. Such a method is disclosed in Japanese Laid-Open Patent Application No. 01-029051.

Further, as a method in which a single IC card is used for a plurality of applications, a method for effectively using a program as a result of an already-existing program being used when a program is added, is disclosed in Japanese Laid-Open Patent Application No. 01-031285. Further, a method, in which operation keys are provided on an IC card, and one of a plurality of applications is selected as a result of a respective one of the operation keys being operated, is disclosed in Japanese Laid-Open Patent Application No. 04-255089.

However, in Japanese Laid-Open Patent Application No. 01-031285, a method of executing the stored program is not disclosed.

Further, in the method disclosed in Japanese Laid-Open Patent Application No. 04-255089, the key operation needed for selecting one of the plurality of applications is troublesome.

SUMMARY OF THE INVENTION

The present invention has been devised in consideration of the above-mentioned points, and an object of the present invention is to provide an application managing method and an information processing apparatus using the method, through which a desired application of a plurality of applications can be easily accessed.

An application managing method, according to the present invention, for a case where a plurality of applications are stored, comprises the steps of:

forming a directory structure corresponding to the plurality of applications;

giving items of identification information to predetermined directories of the directory structure, respectively, the items of identification information being used for identifying the plurality of applications, respectively, the plurality of applications corresponding to the predetermined directories, respectively; and performing management so that an application of the plurality of applications corresponding to a directory of the predetermined directories is selected in accordance with an item of the items of identification information given to the directory of the predetermined directories, when the directory of the predetermined directories is selected.

In the above-described method, when a directory is selected, the corresponding application can be recognized immediately by using the item of identification information given to the selected directory.

The items of identification information may comprise addresses of the plurality of applications, respectively; and an address of the addresses is recognized, and thereby, an application of the plurality of applications corresponding to the address of the addresses is accessed.

In this method, it is possible to execute a desired application immediately by recognizing the address of the application given to the selected directory.

The application managing method may comprises the steps of:

preparing an application management table storing the items of identification information and starting addresses of the plurality of applications which correspond to the items of identification information, respectively; and referring to the application management table when a directory of the predetermined directories is selected, so as to recognize a starting address of an application of the plurality of applications, the starting address corresponding to an item of the identification information given to the directory of the predetermined directories, and to access the application of the plurality of applications.

In this method, the application management table storing the items of identification information and starting addresses of the plurality of applications which correspond to the items of identification information is provided. Therefore, by only changing the relationship between the items of identification information and the starting addresses of the applications in the application management table, it is possible to perform various functions using the storage area which is not large.

The application managing method may comprise the steps of:

storing size information at a starting address of each application of the plurality of applications, the size information indicating a size of the application of the plurality of applications;

repeating detection of the size of an application of the plurality of applications from the size information stored in the starting address of the application of the plurality of applications, and search for a starting address of a next application of the plurality of applications in accordance with the size of the preceding application of the plurality of applications, so as to obtain the starting address of a desired application of the plurality of applications.

In this method, it is possible to obtain the starting address of a desired application using the order in which the applications are stored. Thereby, it is not necessary to prepare the application management table, and thus, it is possible to effectively use the storage capacity.

An item of the items of identification information may be given to the highest directory of the directory structure.

In this method, it is possible that a single application is easily caused to correspond to a plurality of subordinate directories by giving the item of identification information, for identifying the application, to the highest directory of the directories which are used by the application.

An item of the items of identification information may be given to each directory of the directory structure.

Thereby, it is possible to immediately execute an application as a result of the application being recognized from the item of identification information given to any one of directories corresponding to the application.

When an application of the plurality of applications is to be substantially deleted, an item of the items of identification information for the application of the plurality of applications is caused to be ineffective.

Thereby, it is easy to substantially delete an application from the plurality of applications because it is possible to substantially delete this application only by causing the item of identification information of this application to be ineffective without actually deleting this application.

When an application of the plurality of applications is updated, an application obtained from updating the application of the plurality of applications may be added to the plurality of applications; and an item of the items of identification information for identifying the application of the plurality of applications may be changed to an item of identification information for identifying the application obtained from updating the application of the plurality of applications.

Thereby, it is possible to update the application without actually deleting the former application.

An application managing method, according to another aspect of the present invention, comprises the steps of:

storing applications and data used by the applications in a series of storage areas; and managing the applications and data used by the applications stored in the series of storage areas, wherein the series of storage areas is divided into a program area storing the applications and a data area storing the data used by the applications.

In this method, as a result of the series of storage areas being divided into a program area storing the applications and a data area storing the data used by the applications, the data to be used by the applications is prevented from being destroyed when the applications are updated or increased, and the applications are prevented from being destroyed when the data used by the applications is updated or increased.

A boundary between the program area and the data area may be changeable.

Thereby, by arbitrarily changing the boundary between the data area and the program area, appropriate storage capacities of the data area and the program area can be provided in accordance with the amount of the applications and the amount of the data to be used by the applications. Thus, it is possible to effectively use the storage area.

When the applications are stored in the program area, the applications may be stored from an end of the program area opposite to the boundary.

Thereby, it is possible to change the boundary without moving the applications in the program area.

An information processing apparatus, according to another aspect of the present invention, storing a plurality of applications, comprises a directory structure corresponding to the plurality of applications, wherein items of identification information are given to predetermined directories of the directory structure, respectively, the items of identification information being used for identifying the plurality of applications, respectively, the plurality of applications corresponding to the predetermined directories of the directory structure.

In the above-described arrangement, it is possible to rapidly start execution of an application as a result of the application being immediately recognized from the item of identification information given a directory corresponding to the application, when the directory is selected.

The items of identification information may comprise addresses of the plurality of applications, respectively.

Thereby, it is possible to rapidly execute an application as a result of the application being immediately accessed using the address given to the directory.

The information processing apparatus may comprise an application management table which stores the items of identification information and starting addresses of the plurality of applications which correspond to the items of identification information, respectively.

Thereby, only by changing the relationship between the items of identification information and the starting addresses of the applications in the application management table, it is possible to perform various functions using the storage area which is not so large.

An item of the items of identification information may be given to the highest directory of the directory structure.

In this arrangement, it is possible that a single application is easily caused to correspond to a plurality of subordinate directories by giving the item of identification information, for identifying the application, to the highest directory of directories which are used by the application.

An item of the items of identification information may be given to each directory of the directory structure.

Thereby, it is possible to immediately execute an application as a result of the application being recognized from the item of identification information given to any one of directories corresponding to the application.

An information processing apparatus, according to another aspect of the present invention, stores applications and data used by the applications in a series of storage areas, wherein the series of storage areas is divided into two predetermined areas, one of the two predetermined areas storing the applications and the other of the two predetermined areas storing the data used by the applications.

In this arrangement, as a result of the series of storage areas being divided into a program area storing the applications and a data area storing the data used by the applications, the data to be used by the applications is prevented from being destroyed when the applications are updated or increased, and the applications are prevented from being destroyed when the data used by the applications is updated or increased.

Other objects and further features of the present invention will become more apparent from the following detailed description when read in conjunction with the accompanying drawings.

BRIEF DESCRIPTION OF THE DRAWINGS

FIG. 12 shows a data arrangement of an application management table in the second embodiment of the present invention;

DETAILED DESCRIPTIONS OF THE PREFERRED EMBODIMENTS

Figure 1:
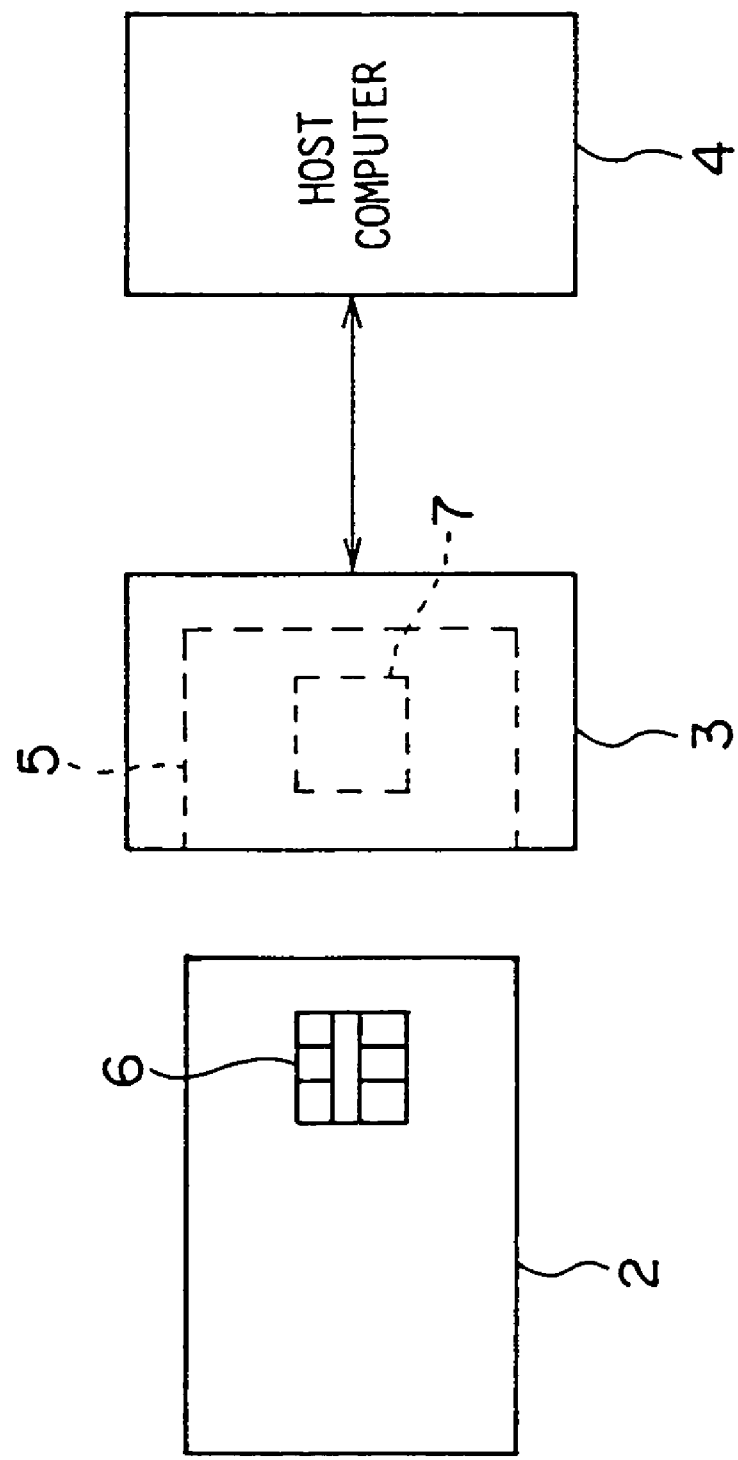
FIG. 1 shows a system arrangement of a first embodiment of the present invention.

FIG. 1 shows a system arrangement of a first embodiment of the present invention.

In this embodiment, a plurality of applications are stored in a single IC card in a system using the IC card, and, thereby, the IC card is used for a plurality of services.

The system 1 in this embodiment includes an IC card reader/writer 3 acting as an interface with the IC card 2, and a host computer 4 connected with the IC card reader/writer 3 and performing information processing in accordance with the applications stored in the IC card 2.

As the IC card 2, for example, a contact-type IC card or a non-contact-type IC card is used. A case where the contact-type IC card is used as the IC card 2 will now be described.

In the case where the contact-type IC card is used, electrical connection is performed as a result of contacts of the IC card coming into contact with connection terminals. When the IC card 2 is inserted into a predetermined insertion portion 5 of the IC card reader/writer 3, the contacts 6 which are exposed on a surface of the IC card 2 come into contact with the connection terminals 7 provided in the insertion portion 5 of the IC card reader/writer 3. As a result of the contacts 6 of the IC card 2 coming into contact with the connection terminals 7 provided in the insertion portion 5 of the IC card reader/writer 3, the IC card 2 is substantially connected with the host computer 4.

In the IC card 2, a necessary application is selected from the plurality of applications stored in an internal memory of the IC card in accordance with a select file command supplied from the host computer 4, and the selected application is executed, automatically.

Figure 2:
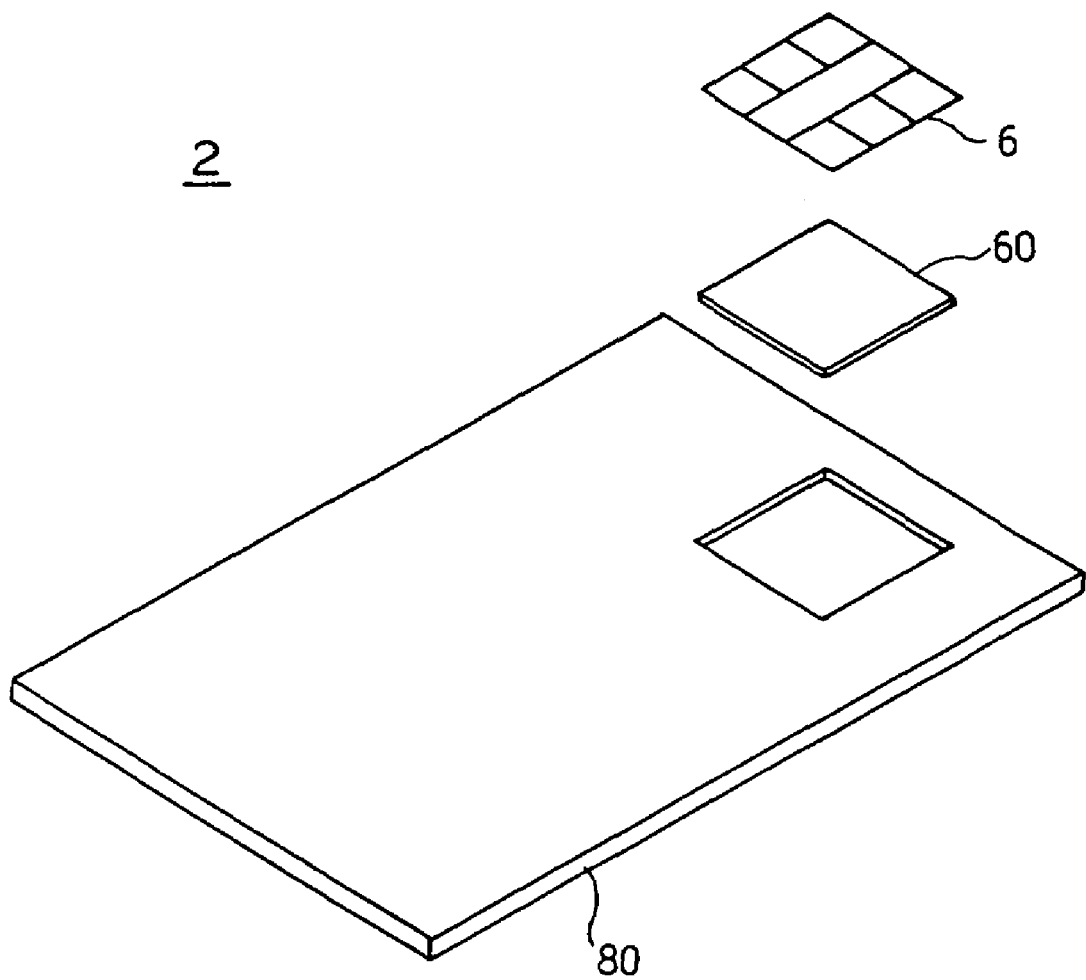
FIG. 2 shows a general arrangement of an IC card in the first embodiment of the present invention.

FIG. 2 shows a general arrangement of the IC card in the first embodiment of the present invention.

For example, the IC card 2 comprises the contact-type IC card as shown in FIG. 2. An LSI circuit 60 is embedded in a card body 80 made of resin, and the contacts 6 of the LSI circuit 60 are exposed on the surface of the card body 80, which contacts 6 of the LSI circuit 60 come into contact with the connection terminals 7 of the IC card reader/writer 3.

Figure 3:
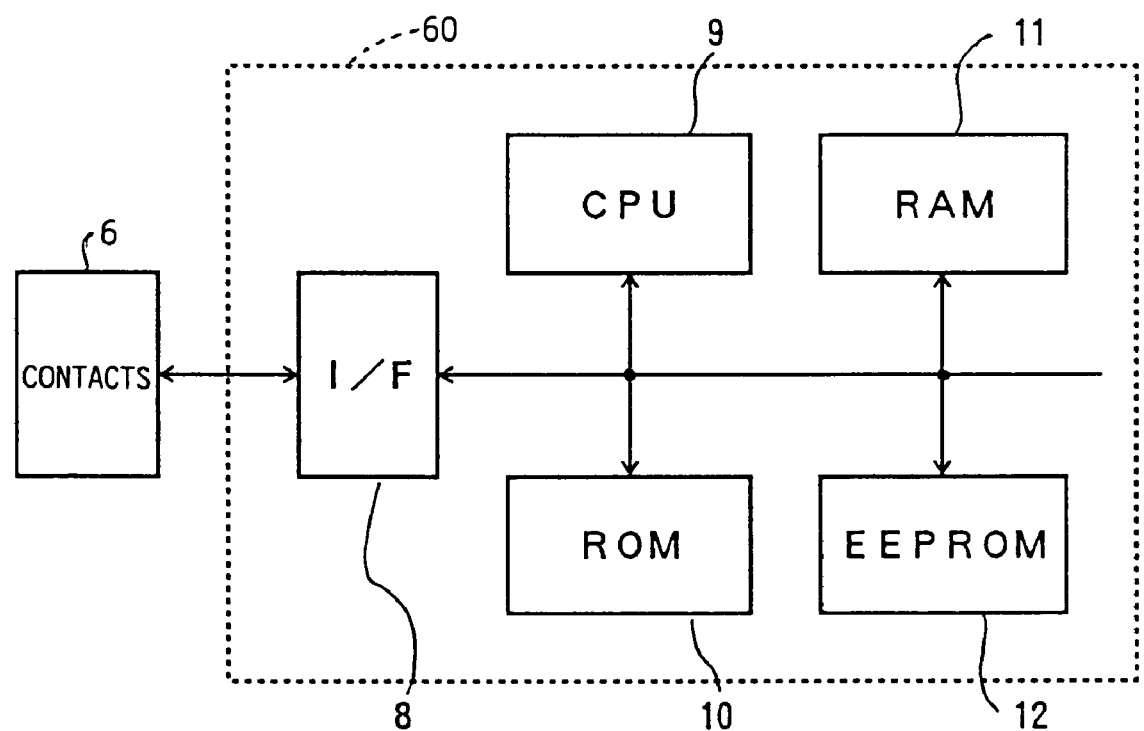
FIG. 3 shows a block diagram of the IC card in the first embodiment of the present invention.

FIG. 3 shows a block diagram of the IC card 2 in the first embodiment of the present invention.

The contacts 6 are connected with the LSI circuit 60, thereby external connection of the LSI circuit 60 being performed. The LSI circuit 60 includes an interface circuit 8 acting as an interface with the IC card reader/writer 3 which is connected with the LSI circuit 60 through the contacts 6, a CPU 9 performing data processing, a basic OS necessary for operating the IC card 2, a ROM 10 storing set values and so forth, a RAM 11 acting as a work area when the CPU 9 performs data processing, and an EEPROM 12 storing the plurality of applications which can be executed in the IC card 2.

Figure 4:
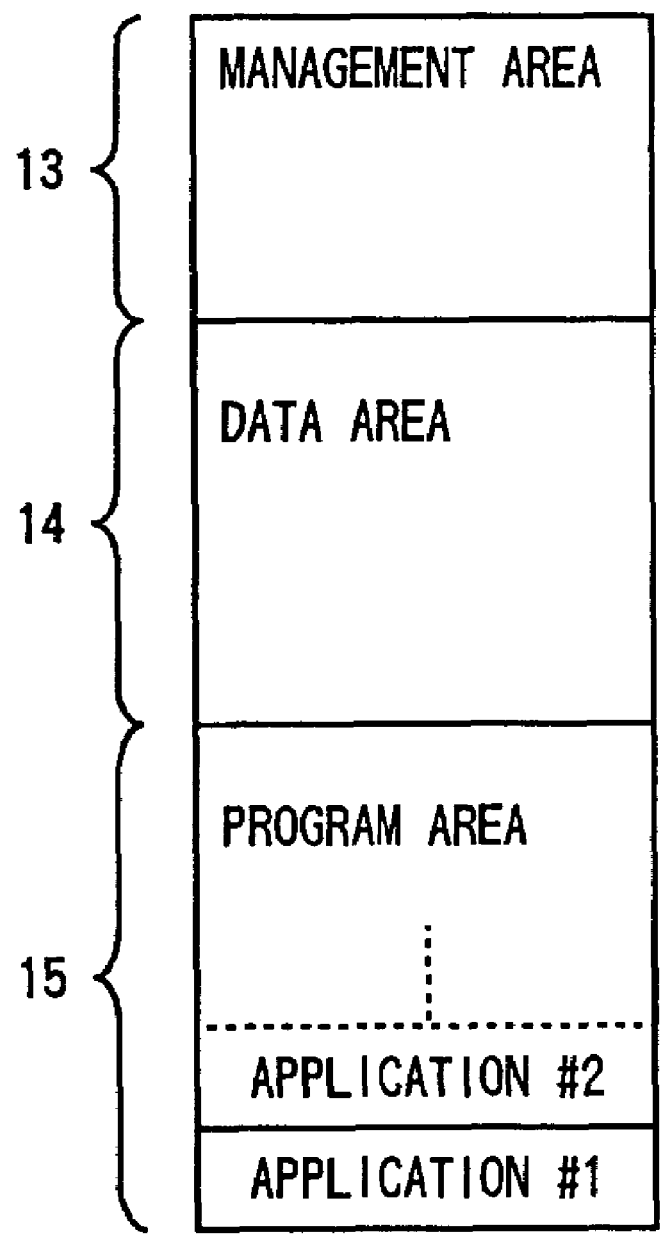
FIG. 4 shows a file arrangement of an EEPROM in the first embodiment of the present invention.

FIG. 4 shows a file arrangement of the EEPROM 12 in the first embodiment of the present invention.

Generally, the EEPROM 12 includes a management area 13 storing management information for managing data and the applications stored in other storage areas of the EEPROM 12, a data area 14 storing data such as a file structure, the files of which are used by the applications, and a program area 15 storing the applications.

The starting address, in the program area 15, of each application stored in the program area 15 is given to the highest directory of directories of the file structure stored in the data area 14, the files of the above-mentioned directories being used by the above-mentioned applications.

The program area 15 is completely separated from the data area 14, and the boundary of these two areas is changeable.

Figure 5:
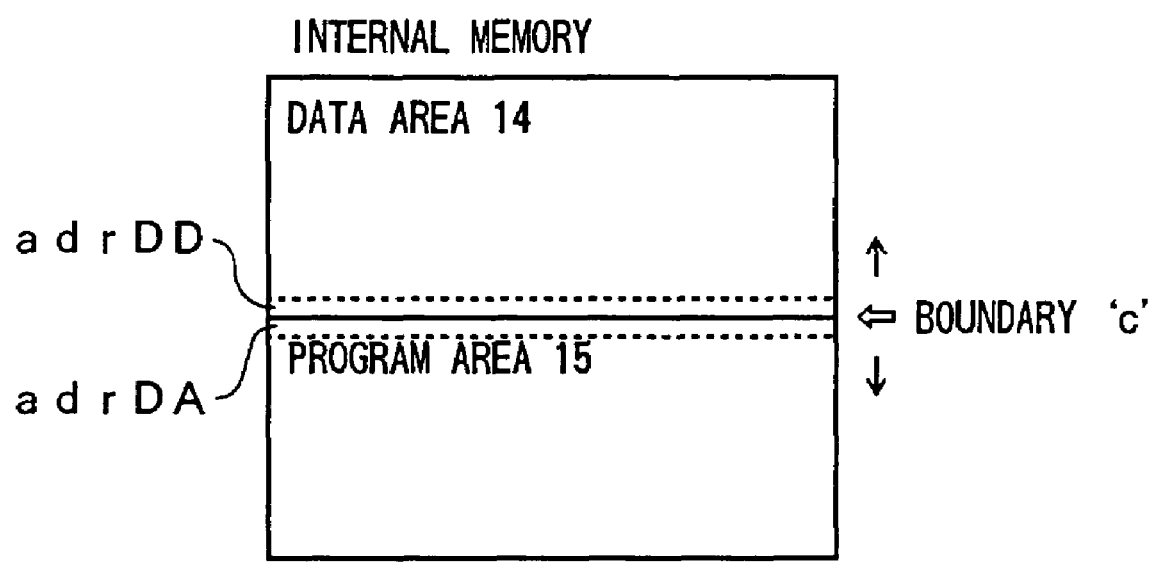
FIG. 5 shows separation of a storage area of the EEPROM in the first embodiment of the present invention.

FIG. 5 illustrates the area separation in the EEPROM 12 in the first embodiment of the present invention.

With reference to FIG. 5, the boundary 'c' between the data area 14 and the program area 15 is managed, as the last address of the data area 14 'adrDD' or the first address of the program area 15 'adrDA', in the management area 13.

When files stored in the data area 14 are updated, control is performed so that the data stored in the data area 14 does not exceed the boundary 'c', that is, the last address 'adrDD' of the data area 14 or the first address 'adrDA' of the program area 15 as a result of the updating of the files, the information of the boundary 'c' being managed in the management area 13. Similarly, when the applications are updated, control is performed so that the applications stored in the program area 15 do not exceed the boundary 'c', that is, the last address 'adrDD' of the data area 14 or the first address 'adrDA' of the program area 15 as a result of the updating of the applications, the information of the boundary 'c' being managed in the management area 13.

As a result of the data stored in the data area 14 and the applications stored in the program area 15 being managed by using the boundary 'c', the data stored in the data area 14 is prevented from being destroyed by the applications when the updating of the applications or the like is performed, and, similarly, the applications stored in the program area 15 are prevented from being destroyed by the files when the updating of the files or the like is performed.

Further, because the information of the boundary 'c' is managed by using the address set in the management area 13, the position of the boundary 'c' can be easily changed as a result of the address managed in the management area 13 being changed.

Thereby, for example, in a case where a storage capacity of the program area 15 is insufficient while the data area 14 has storage capacity to spare, the necessary storage capacity can be provided for the program area 15 as a result of only the address, which determines the boundary 'c', managed in the management area 13 being changed to the side of the data area 14.

Similarly, in a case where a storage capacity of the data area 14 is insufficient while the program area 15 has storage capacity to spare, the necessary storage capacity can be provided for the data area 14 as a result of only the address, which determines the boundary 'c', managed in the management area 13 being changed to the side of the program area 15.

Figure 6:
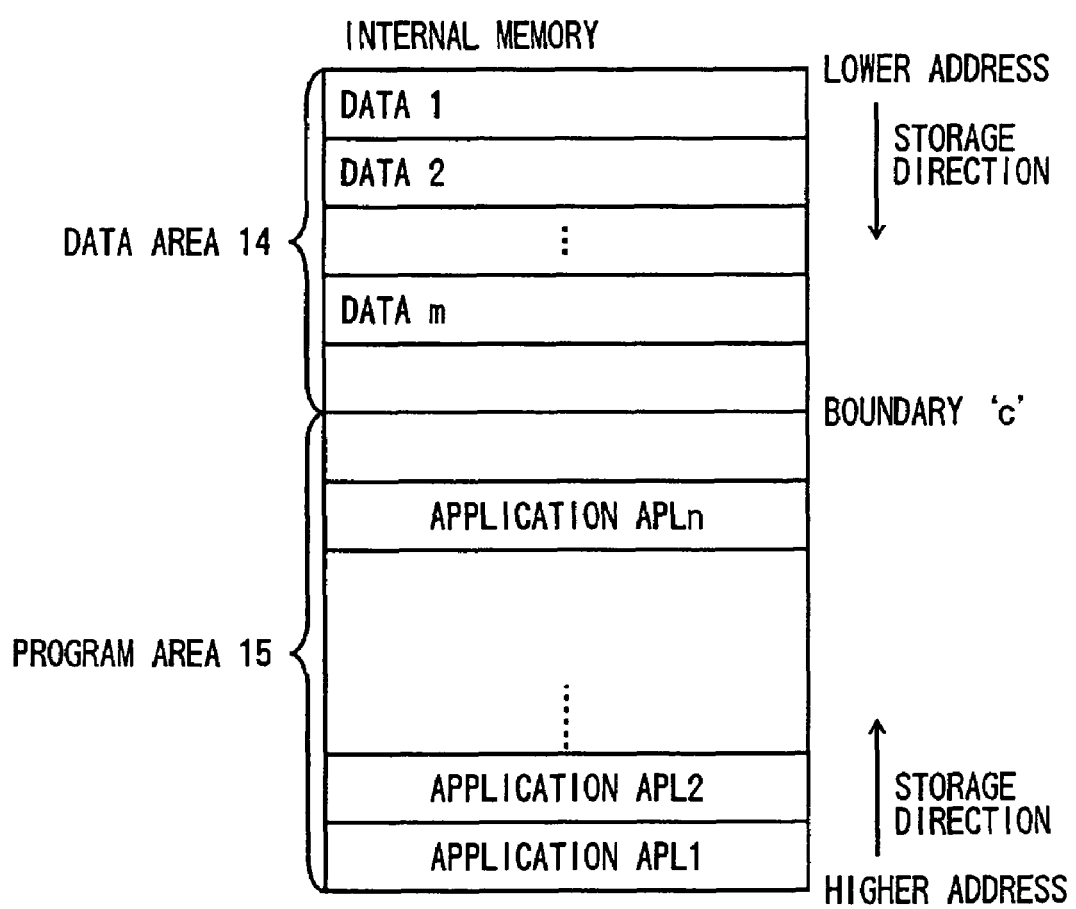
FIG. 6 shows a method for storing data and applications in the EEPROM in the first embodiment of the present invention.

Further, in the first embodiment, as shown in FIG. 6, the data, 'data 1', 'data2', ..., 'data m', is stored in the data area 14 from the lower address of the EEPROM 12 in the order of the addresses, while the applications, APL1, APL2, ..., APLn, are stored in the program area 15 from the higher address of the EEPROM 12 in the order reverse to the order of the addresses. Thus, the last data 'data m' of the data area 14 is stored before the boundary 'c' while the last application APLn stored in the program area 15 is stored after the boundary 'c'. As a result, the boundary 'c' between the data area 14 and the application area 15 can be changed without moving the data stored in the data area 14 or the applications stored in the program area 15.

Specifically, when the applications are stored in the program area 15, first, the application APL1 is stored from the highest address in the order reverse to the order of the addresses. Then, the application APL2 is stored from the address immediately lower than the address at which the last item of the application APL1 has been stored, in the order reverse to the order of the addresses. Then, similarly, each subsequent application is stored from the higher address in the order reverse to the order of the addresses.

Figure 7:
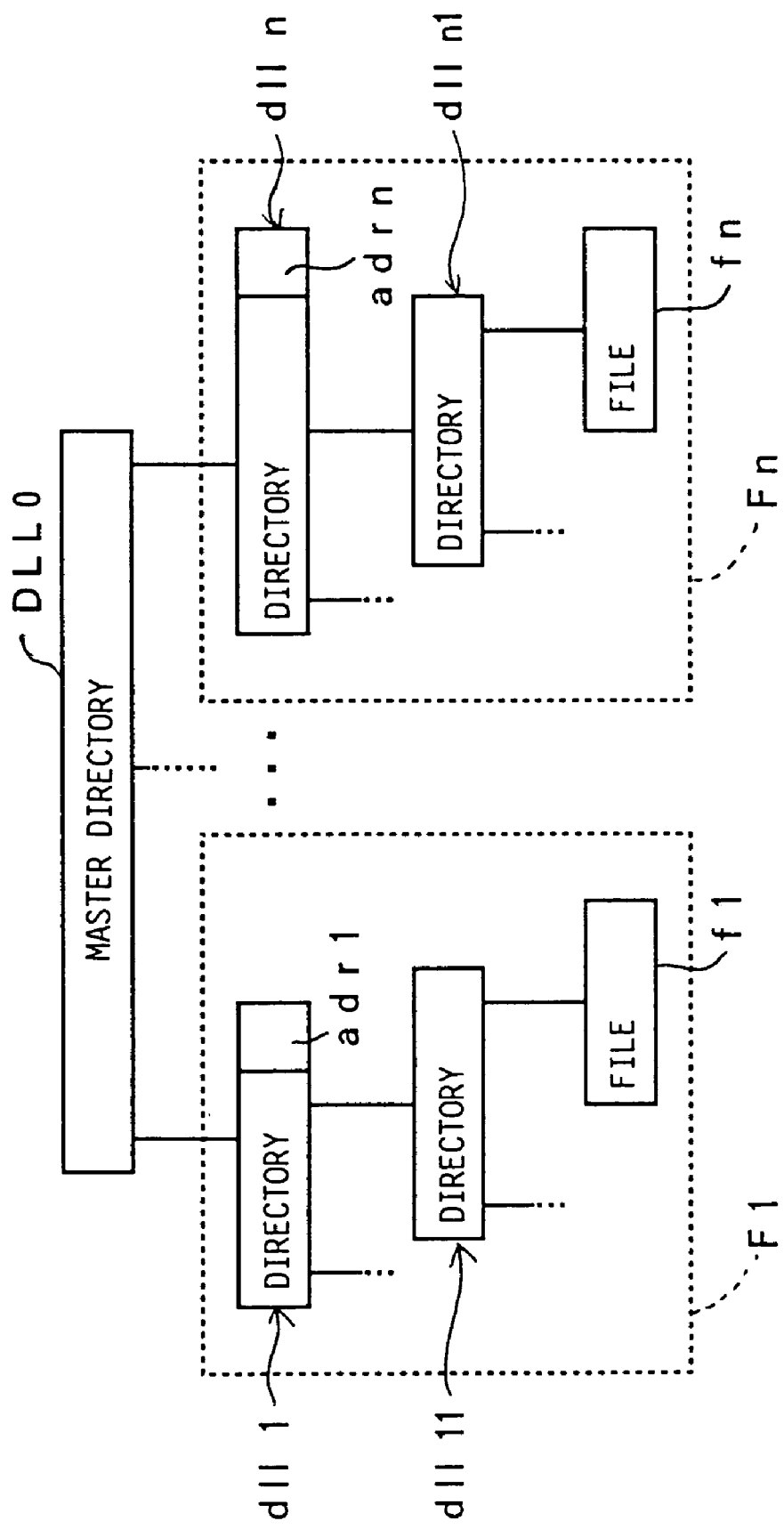
FIG. 7 shows a file structure in the first embodiment of the present invention.

FIG. 7 illustrates the file structure stored in the data area 14 in the first embodiment of the present invention.

The file structure in the first embodiment of the present invention includes a master directory DLL0, and file portions F1 through Fn subordinate to the master directory DLL0. The file portions F1 through Fn include files f1 through files fn, respectively, which are used by the applications APL1 through APLn, respectively, and highest directories dll1 through dlln, and subordinate directories dll11 through directories dlln1.

The starting addresses adr1 through adrn of the applications APL1 through APLn, which addresses adr1 through adrn are starting addresses in the program areas 15 from which the applications APL1 through APL2 are stored, respectively, are given to the highest directories dll1 through dlln of the file portions F1 through Fn, respectively. The file portions F1 through Fn include files f1 through files fn used by the applications APL1 through APLn, respectively, as mentioned above.

Figure 8:
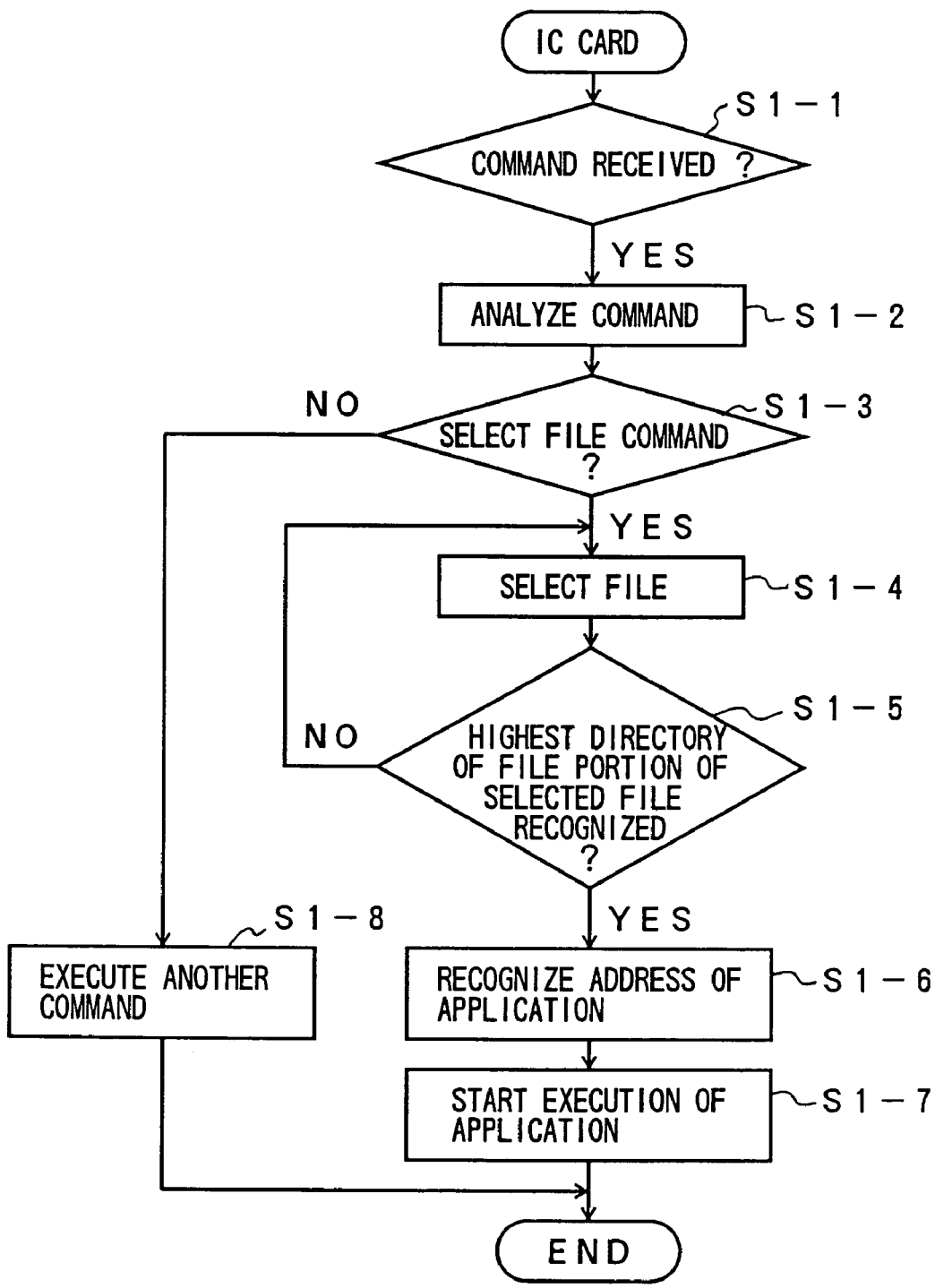
FIG. 8 shows a processing flowchart for accessing an application in the IC card in the first embodiment of the present invention.

FIG. 8 shows a processing flowchart for accessing an application of the applications stored in the program area 15 in the IC card in the first embodiment of the present invention.

When a command is supplied from the host computer 4 to the IC card 2 through the IC card reader/writer 3 (in a step S1-1), the received command is analyzed in the IC card 2 (in a step S1-2).

Then, it is determined whether or not the received command is the select file command (in a step S1-3). When it is determined in the step S1-3 that the received command is the select file command, a file specified by this select file command is selected (in a step S1-4).

When the file is selected in the step S1-4, the highest directory of the file portion which includes the selected file is recognized (in a step S1-5). Then, the starting address of the application given to the highest directory of the file portion is recognized, the file portion corresponding to this application, that is, the files included in the file portion being used by the application (in a step S1-6). When the starting address of the application is recognized in the step S1-6, the application stored at the recognized starting address is accessed and a command of the application is read from this starting address and execution of the application is started (in a step S1-7).

At this time, although only the starting address of the application was given to the highest directory of the respective file portion, because the size of the application is written at this starting address, the last address of the application can be recognized. As mentioned above, the application is stored from a higher address in the order reverse to the order of the addresses. Therefore, when the application is executed, the count value of a program counter is decremented successively from the starting address.

Thus, as mentioned above, the information of the size of the application is written at the starting address of the application. Thereby, only as a result of the starting address of the application being set in the highest directory of the file portion of the selected file, the desired application can be executed.

When it is determined in the step S1-3 that the received command is another command, the IC card 2 performs the processing in accordance with this command (in a step S1-8).

Thus, in the first embodiment of the present invention, as a result of only a file being specified by the select file command supplied from the host computer 4, the application corresponding to the specified file is automatically executed.

In the first embodiment of the present invention, the starting address of each application is given to the highest directory of a respective file portion. However, it is also possible that the starting address of each application be given to a subordinate directory or subordinate directories of a respective file portion.

Figure 9:
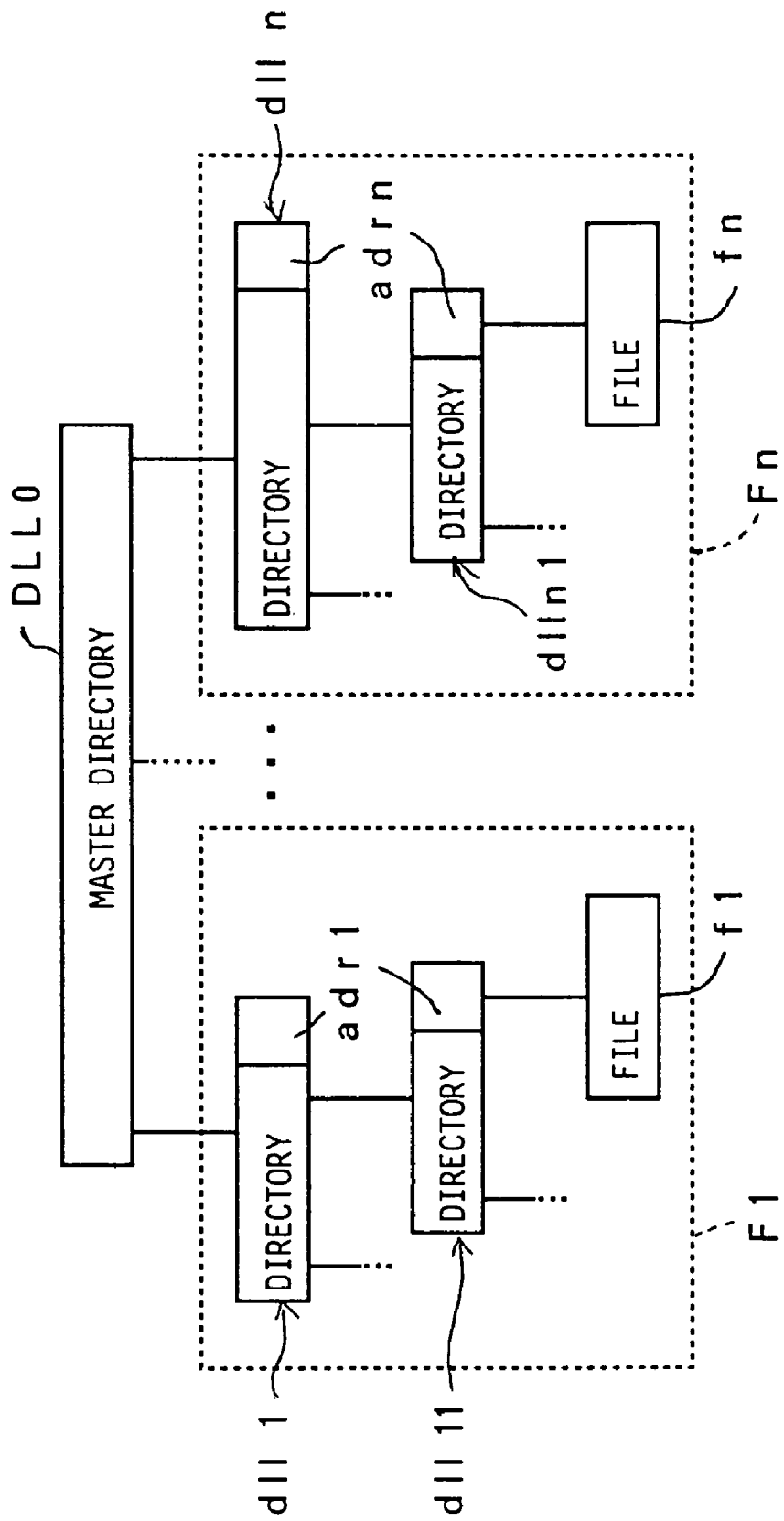
FIG. 9 shows a file structure in a variant embodiment of the first embodiment of the present invention.

FIG. 9 illustrates a file structure in a variant embodiment of the first embodiment of the present invention. The same reference symbols are given to portions/components the same as those shown in FIG. 7, and the descriptions thereof will be omitted.

In this variant embodiment, similar to the highest directories dll1 through dlln of the respective file portions F1 through Fn, the starting addresses, in the program area 15, of the corresponding applications are given to the directories dll11 through directories dlln1 subordinate to the highest directories dll1 through dlln, respectively.

In this variant embodiment, the starting address of each application can be obtained from any one of the directories of a respective file portion. As a result, it is not necessary to select the highest directory from the directories of the file portion. As a result, execution of the application can be performed quickly as a result of the application being accessed immediately.

In the file structures shown in FIGS. 7 and 9, the starting addresses of the applications are given to the directories of the file portions F1 through Fn, respectively. However, it is also possible that the starting address of an application APL0 is given to the master directory DLL0.

Figure 10:
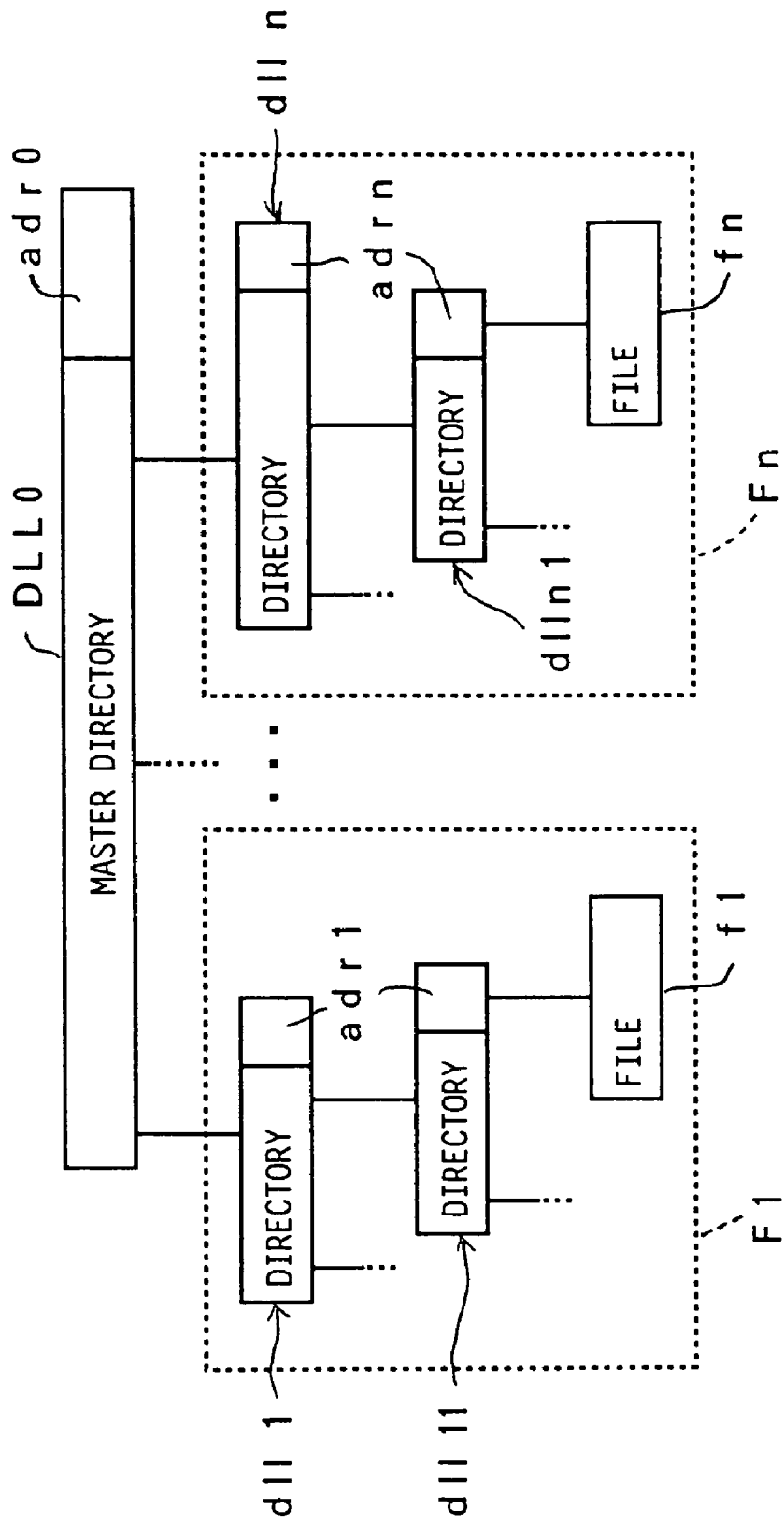
FIG. 10 shows a file structure in another variant embodiment of the first embodiment of the present invention.

FIG. 10 illustrates the file structure in another variant embodiment of the first embodiment of the present invention. The same reference symbols are given to portions/ components the same as those shown in FIG. 9, and the descriptions thereof will be omitted.

In this other variant embodiment, similar to the highest directories dll1 through dlln of the respective file portions F1 through Fn, the starting addresses, in the program area 15, of the corresponding applications are given to the directories dll11 through directories dlln1 subordinate to the highest directories dll1 through dlln, respectively. Further, the starting address adr0, of the program area 15, from which the corresponding application APL0 is stored, is given to the master directory DLL0.

In this other variant embodiment, the address of each application can be obtained from any one of the directories of a respective file portion. As a result, it is not necessary to select the highest directory from the directories of the file portion. As a result, execution of the application can be performed quickly because recognition of and access to the starting address of the application is performed immediately. Further, as a result of the starting address adr0, of the program area 15, from which the application APL0 is stored, being given to the master directory DLL0, it is possible that the starting address adr0 of the application APL0 which can use files of a plurality of file portions in the file structure can be included in the program area 15.

In the case of this other variant embodiment, when the file select command supplied from the host computer 4 specifies files of a plurality of file portions (ones of F1, F2, . . . , Fn), these files of the plurality of file portions are selected in the step S1-4. Then, in this case, the master directory DLL0 is recognized in the step S1-5, the starting address adr0 of the application APL0 is recognized in the step S1-6. Then, a command of this application APL0 written at the starting address adr0 is read, and the application APL0 is executed (in the step S1-7).

In the case of this other variant embodiment, when the file select command supplied from the host computer 4 specifies a file(s) of a single file portion Fm (m=1, 2, 3, . . . , or n), the file(s) of the single file portion Fm is (are) selected in the step S1-4. Then, in this case, the highest directory dllm, or the directory dllm1 or the like subordinate to the highest directory is recognized in the step S1-5, the starting address adrm of the application APLm is recognized in the step S1-6. Then, a command of this application APLm written at the starting address adrm is read, and the application APLm is executed (in the step S1-7).

In the above-described embodiments, the starting addresses of the applications are directly given to the directories of the file portions, respectively. However, it is also possible that identification numbers of the applications are given to the directories, respectively, an application management table storing the identification numbers and the starting addresses of the applications having the identification numbers, respectively, is provided, and the application management table is referred to so that the starting addresses of the applications can be obtained from the identification numbers of the applications, respectively, which identification numbers have been given to the directories, respectively.

An embodiment in the case where the application management table is provided will now be described. The system arrangement of the embodiment (second embodiment) is similar to that of the above-described first embodiment, and, therefore, the descriptions thereof will be omitted.

Figure 11:
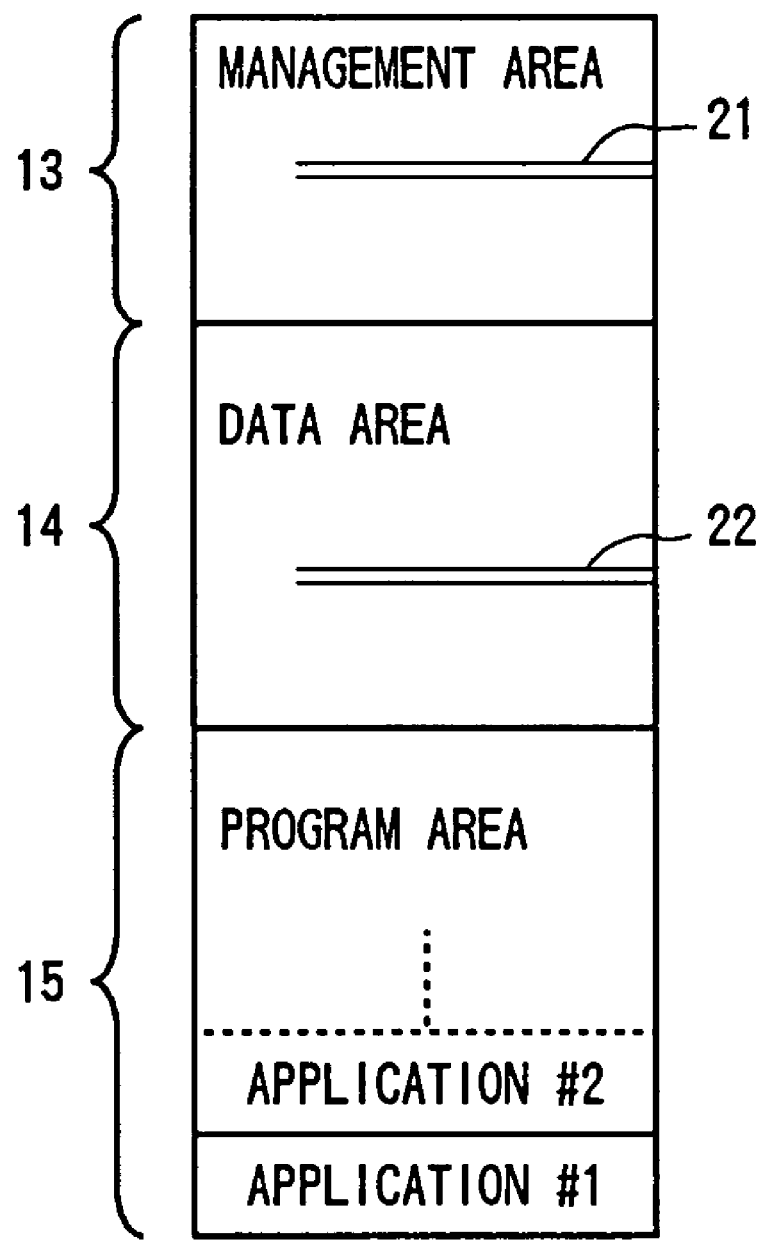
FIG. 11 shows a file arrangement of an EEPROM in a second embodiment of the present invention.

FIG. 11 shows a file arrangement of an EEPROM 20 in the second embodiment of the present invention.

The same reference numerals are given to portions the same as those shown in FIG. 4, and the descriptions thereof will be omitted.

In the second embodiment, the application management table 21 is provided in the management area 13 of the EEPROM 20, and the identification numbers of the applications are given to the directories of the file structure 22, respectively, stored in the data area 14.

FIG. 12 shows a data arrangement of the application management table 21 in the second embodiment of the present invention.

As shown in FIG. 12, the application management table 21 includes the identification numbers #0, #1; #2, . . . , #n given to the applications APL0, APL1, APL2, . . . , APLn stored in the program area 15 of the EEPROM 20, respectively, and the starting addresses adr0, adr1, adr2, . . . , adrn; in the program area 15, of the applications APL1, APL2, . . . , APLn having the identification numbers #0, #1, #2, . . . , #n, respectively.

The above-mentioned identification numbers #0, #1, #2, . . . , #n are given to the directories, respectively, which correspond to the applications. APL0, APL1, APL2, . . . , APLn, respectively.

Figure 13:
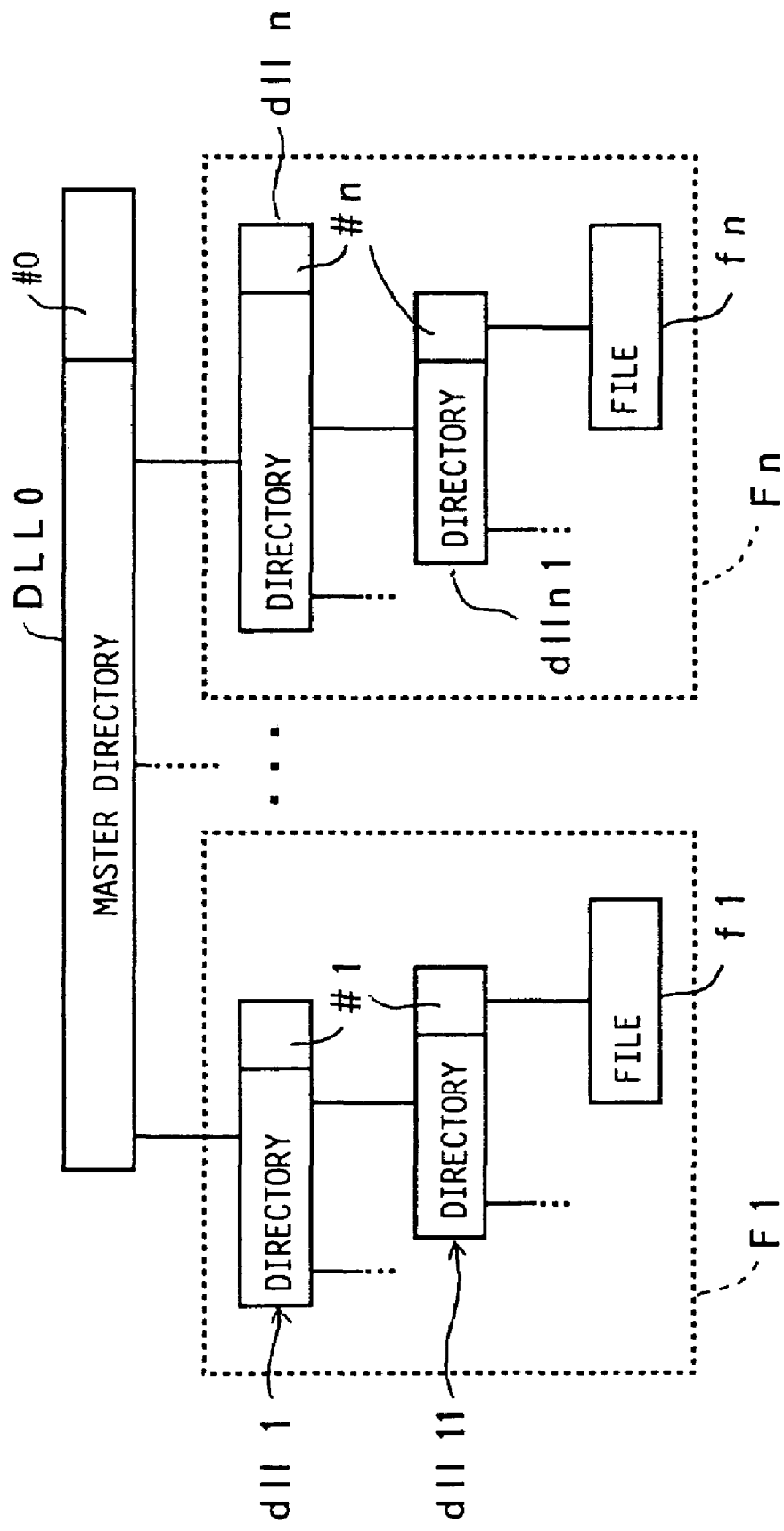
FIG. 13 shows a file structure in the second embodiment of the present invention.

FIG. 13 illustrates a file structure in the second embodiment of the present invention. The same reference symbols are given to portions/components the same as those shown in FIG. 10, and the descriptions thereof will be omitted.

The file structure in the second embodiment includes the master directory DLL0, the directories dll1 through dlln subordinate to the master directory DLL0, the directories dll11 through directories dlln1 subordinate to the directories dll1 through dlln, respectively, and the files f1 through files fn, as shown in FIG. 13. The identification numbers #0, #1, #2, . . . , #n are given to these directories, corresponding to the applications APL0, APL1, APL2, . . . , APLn, respectively. The identification numbers #0, #1, #2, . . . , #n are used for identifying the applications APL0, APL1, APL2, . . . , APLn, respectively.

Figure 14:
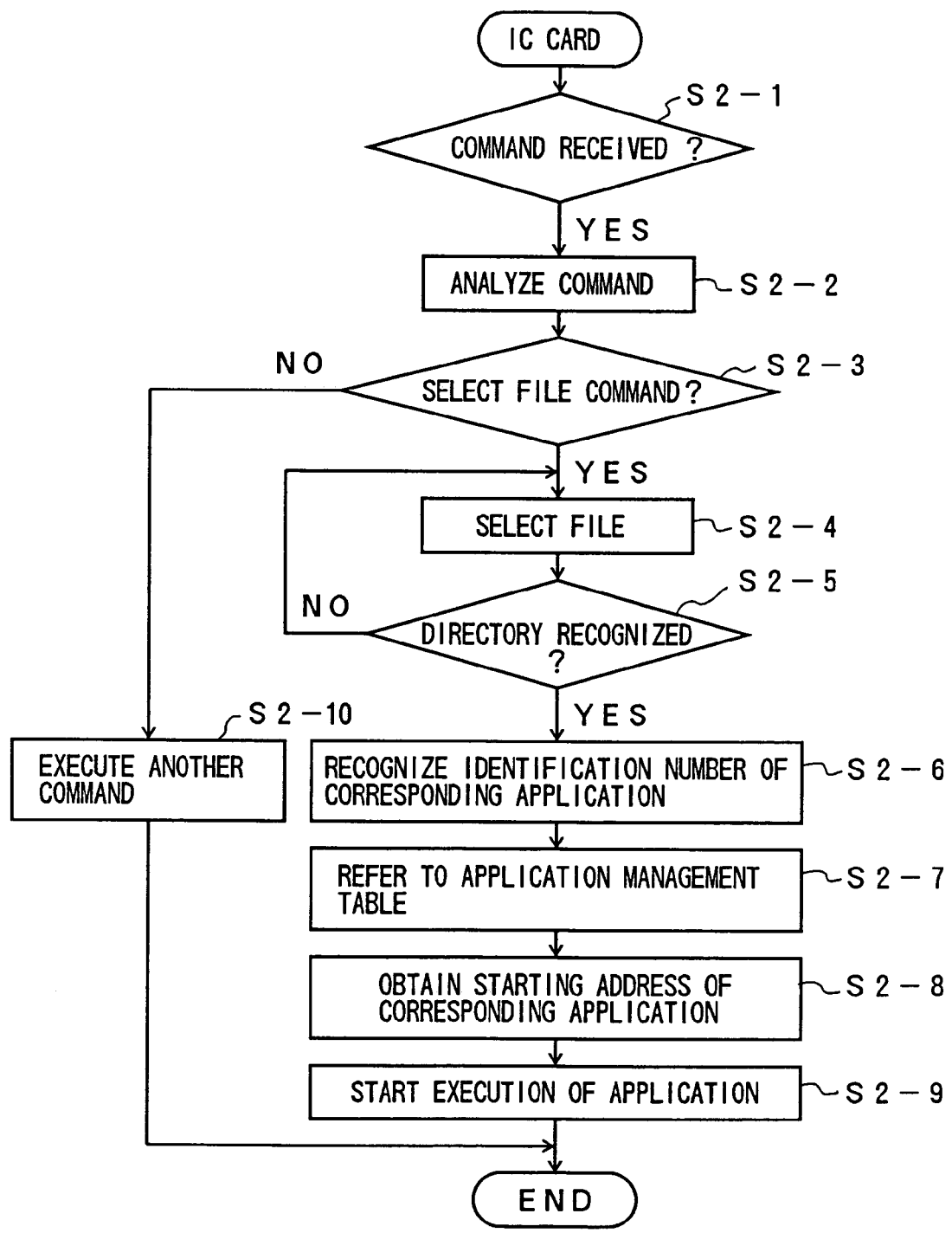
FIG. 14 shows a processing flowchart for accessing an application in an IC card in the second embodiment of the present invention.

FIG. 14 shows a processing flowchart for accessing an application in the IC card in the second embodiment of the present invention.

When a command is supplied from the host computer 4 to the IC card 2 through the IC card reader/writer 3 (in a step S2-1), the received command is analyzed (in a step S2-2).

Then, it is determined whether or not the received command is the select file command (in a step S2-3). When it is determined in the step S2-3 that the received command is the select file command, a file specified by this select file command is selected (in a step S2-4).

When the file is selected in the step S2-4, a directory of the file portion of the selected file is recognized (in a step S2-5). Then, the identification number (one of #1, #2, . . . , #n) of the application given to the recognized directory of the file portion is recognized, which file portion corresponds to this application (in a step S2-6). When the identification number of the application is recognized in the step S2-6, the application management table 21 set in the management area 13 of the EEPROM 20 is referred to (in a step S2-7). Thereby, the starting address (one of adr1, adr2, . . . , adrn), in the program area 15, of the application (one of the applications APL1, APL2, . . . APLn) corresponding to the identification number (the one of #1, #2, . . . , #n) is obtained (in a step S2-8).

The starting address (the one of adr1, adr2, . . . , adrn) of the application (the one of the applications APL1, APL2, . . . , APLn) is accessed, a command of this application is read from the accessed starting address and execution of this application is started (in a step S2-9).

When it is determined in the step S2-3 that the received command is another command, the processing in accordance with this command is performed (in a step S2-10).

When the file select command supplied from the host computer 4 specifies files of a plurality of file portions (ones of F1, F2, . . . , Fn), these files of the plurality of file portions are selected in the step S2-4. Then, in this case, the master directory DLL0 is recognized and the identification number #0 given to the master directory DLL0 is recognized in the step S2-6. Then the application management table 21 is referred to (in the step S2-7) and the starting address adr0 of the application APL0 is obtained in the step S2-8. Then, a command of this application APL0 written at the starting address adr0 is read, and the application APL0 is executed (in the step S2-9).

When the file select command supplied from the host computer 4 specifies files of a single file portion Fm (m=1, 2, 3, . . . , or n), these files of the single file portion are selected in the step S2-4. Then, in this case, the highest directory dllm, or the directory dllm1 or the like subordinate to the highest directory is recognized, and the identification number #m given to the highest directory dllm, or the directory dllm1 or the like subordinate to the highest directory is recognized in the step S2-6. Then, the application management table 21 is referred to (in the step S2-7) and the starting address adrm of the application APLm is obtained in the step S2-8. Then, a command of this application APLm written at the starting address adrm is read, and the application APLm is executed (in the step S2-9).

Thus, in the second embodiment of the present invention, as a result of only a file (or files) being specified by the select file command supplied from the host computer 4, the application corresponding to the specified file(s) is automatically executed.

In the second embodiment, when an application is updated, an existing application is left, as it is, and an updated application is additionally stored in the program area 15. Then, the address of the application corresponding to the identification number of the application to be updated is changed to the starting address of an application obtained as a result of the application to be updated being updated.

Figure 15:
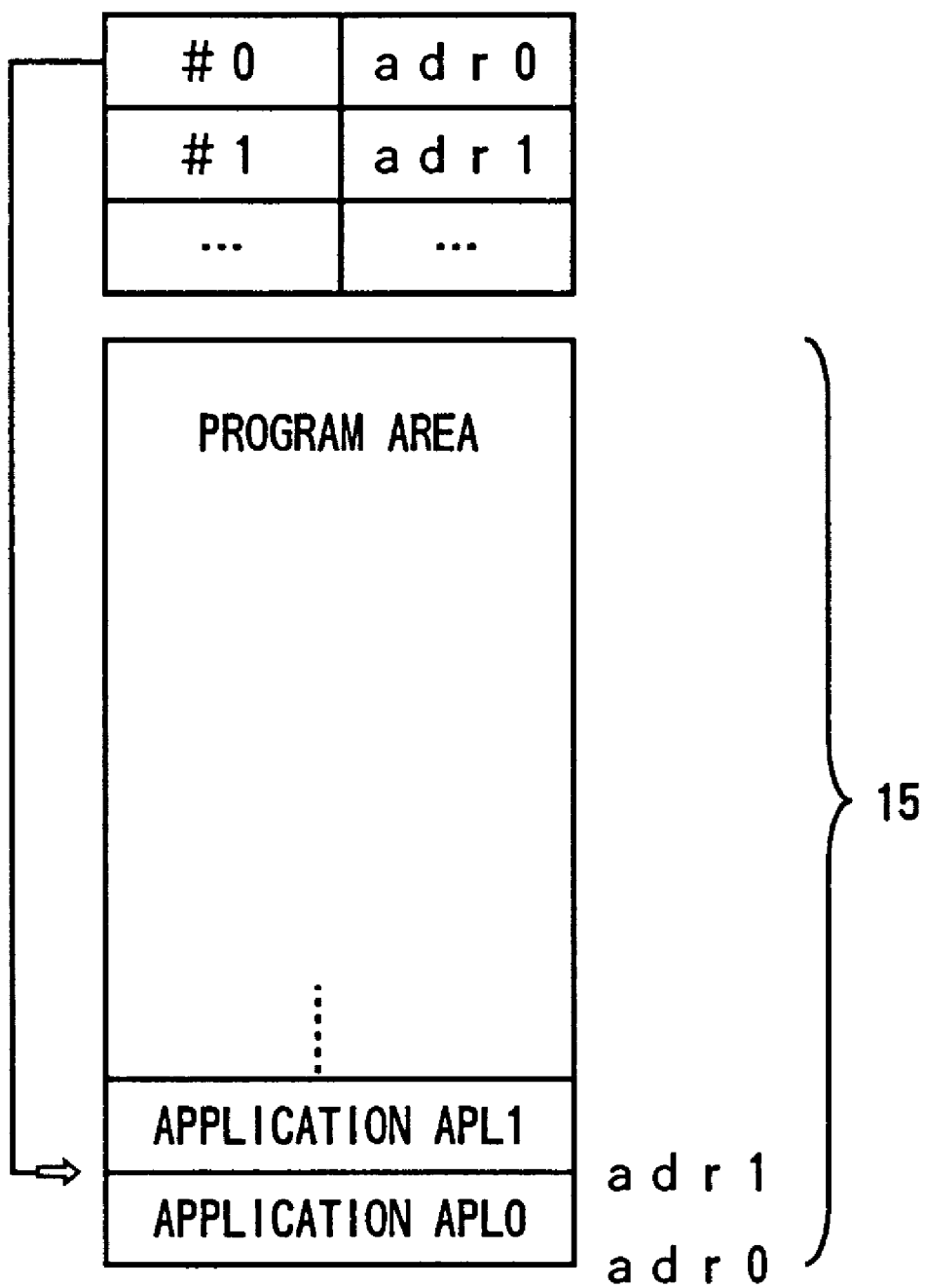
FIGS. 15, 16 and 17 illustrate operations for updating an application in the second embodiment.
Figure 16:
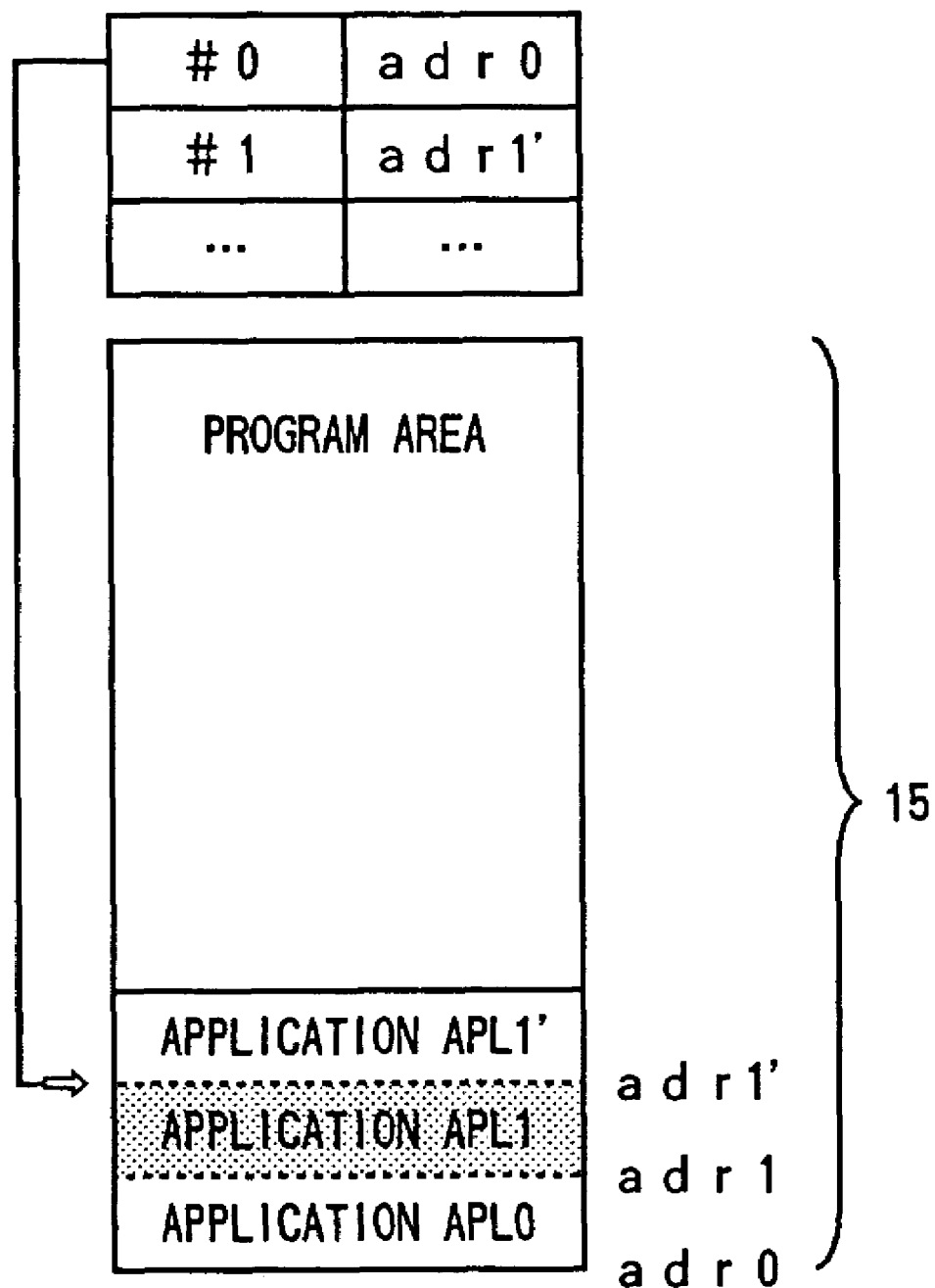
Figure 17:
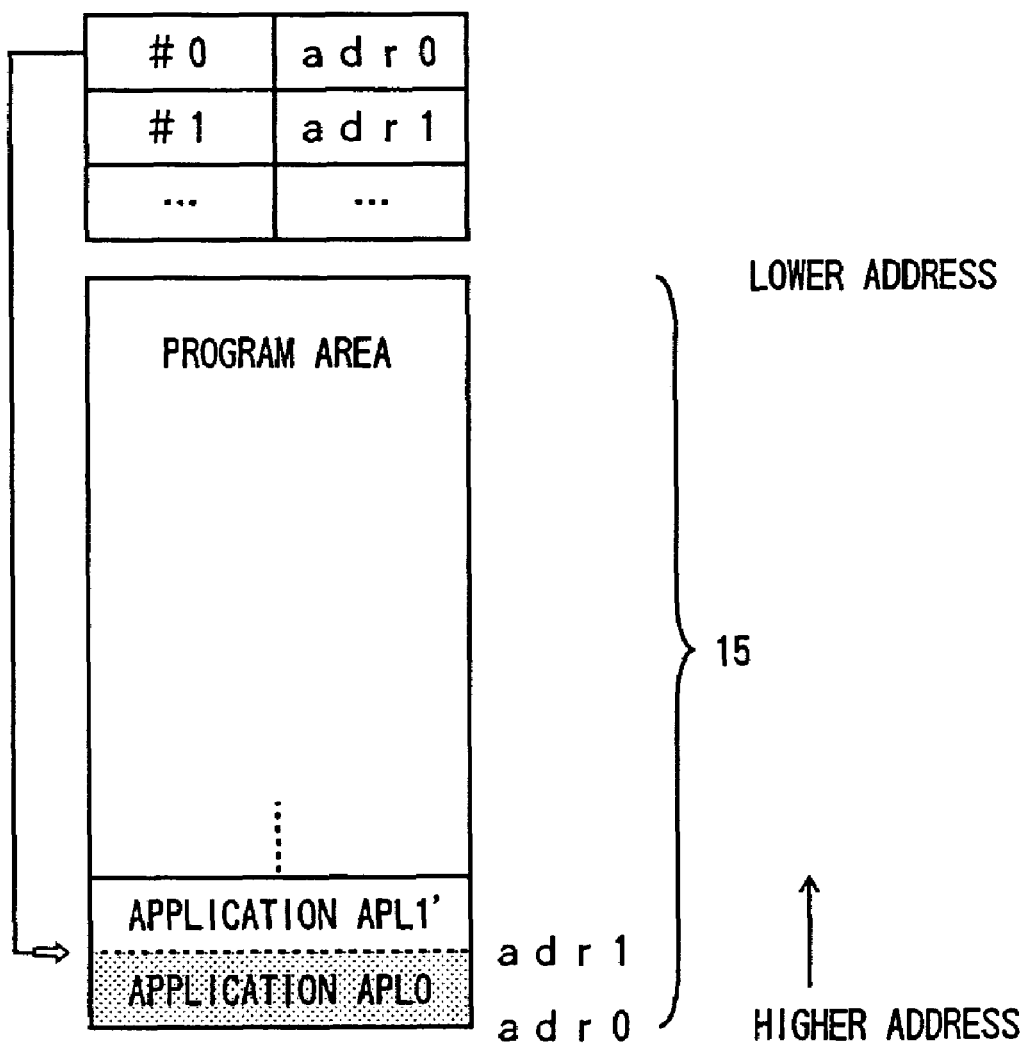

FIGS. 15, 16 and 17 illustrate operations in the second embodiment of the present invention for updating an application stored in the program area 15. FIG. 15 shows states of the program area 15 and the application management table 21 before an application is updated. FIG. 16 shows states of the program area 15 and the application management table 21 after the application is updated. FIG. 17 shows states of the program area 15 and the application management table 21 after the former application is deleted.

As shown in FIG. 15, in the case where the application APL1 is stored in the program area 15, the identification number #1 for identifying the application APL1 and the starting address adr1 of the application APL1 are stored in the application management table 21.

When the application APL1 is updated, as shown in FIG. 16, the application APL1 is left, as it is, and an application APL1' obtained from the application APL1 being updated is additionally stored in the program area 15.

Then, the starting address adr1 of the former application APL1 corresponding to the identification number #1 is changed to the starting address adr1' of the newly stored application APL1', as shown in FIG. 16.

Thus, the application APL1 corresponding to the identification #1 is changed to the application APL1' while the former application APL1 is left in the program area 15, as it is.

Further, in order to efficiently use the storage capacity of the program area 15, as shown in FIG. 17, the former application APL1 may be deleted from the program area 15. In this case, the former application APL1 is deleted, the newly stored application APL1' is moved to the position at which the former application APL1 has been stored, and the starting address for the identification number #1 is returned to the former starting address adr1.

Thus, the application APL1 is updated to the application APL1'.

In the second embodiment, it is possible to substantially delete an application from the program area 15, only by causing the identification number of the application to be substantially deleted to be ineffective in a case where the applications are managed by using the identification numbers. Thus, when the applications are managed by using the identification numbers, it is possible to simplify the process of substantially deleting an application from the program area 15 only by changing the starting address of the application to be deleted into an ineffective numeral or symbol (for example, a numeral which is not included in the addresses of the EEPROM). Thereby, it is possible to substantially delete an unnecessary application from the program area 15 without actually deleting this application.

In the above-described first embodiment, an application is accessed by using the starting address thereof. In the above-described second embodiment, an application is accessed by using the starting address thereof which is obtained through the application management table 21 from the identification number of the application to be executed. An arrangement in which, without using the management table 21, an application is accessed directly by using the identification number thereof can be considered.

Figure 18:
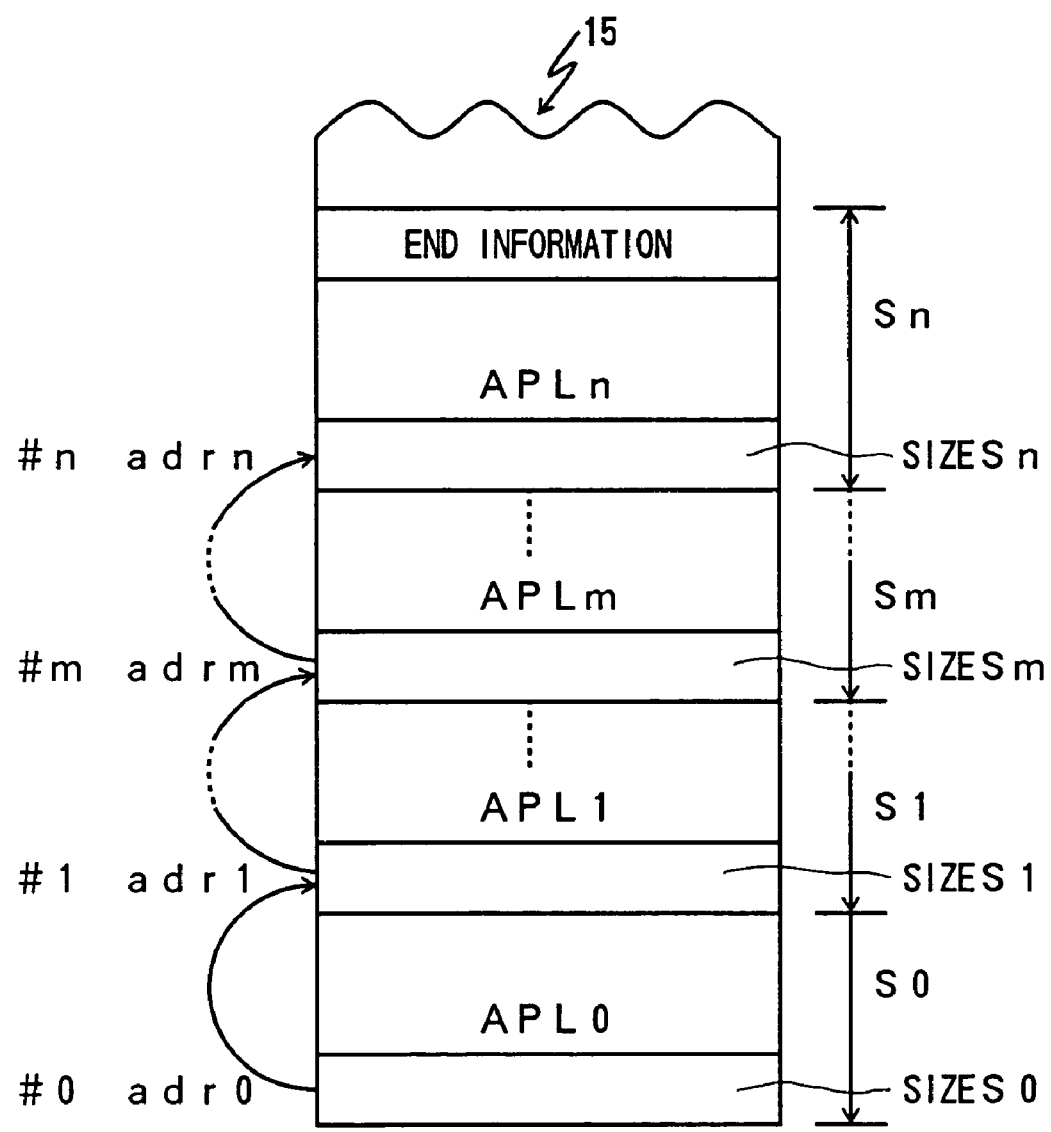
FIG. 18 illustrates operations for accessing an application in the third embodiment.

FIG. 18 illustrates operations for executing an application in a third embodiment of the present invention. In the third embodiment, without using the management table 21, an application is accessed directly by using the identification number thereof.

The third embodiment includes the file structure the same as that of the second embodiment shown in FIG. 13. The third embodiment does not includes the application management table 21.

In the third embodiment, when one of the identification numbers #0 through #n is obtained from a directory of the directories shown in FIG. 13, for example, when an identification #m is obtained, the starting address adr0 of the first stored application APL0 is searched for. Then, size information S0, which indicates the size of the application APL0 and is stored at the starting address adr0 of the application APL0, is obtained. Then, as an initial value, the identification number #0 is obtained.

Then, the starting address adr1 of the application APL1 which is stored next to the application APL0 is searched for as a result of subtracting the size indicated by the size information S0 from the starting address adr0 of the application APL0. Then, size information S1, which indicates the size of the application APL1 and is stored at the starting address adr1 of the application APL1, is obtained. Then, the identification number #1 is obtained as a result of '1' being added to the previously obtained identification number #0.

The above-mentioned operations are repeated until the identification number #m is obtained.

End information is stored at the last address of the last application APLn so that the starting address of a new application can be easily set when the new application is stored in the program area 15.

In the above-described third embodiment, because the application management table 21 is not needed, it is possible to effectively use the storage capacity of the EEPROM.

In each of the first, second and third embodiments, the applications are stored from the higher address to the lower address as described above. However, the relationship between the management area 13, data area 14 and program area 15 and the relationship between the addresses are relative. Accordingly, it is not necessary to be limited to the above-mentioned form.

Further, the case where the contact-type IC card is used has been described in the descriptions of the embodiments. However, each of these embodiments can be applied in the case where the non-contact-type IC card is used instead of the contact-type IC card.

Further, the present invention is not limited to the above-described embodiments, and variations and modifications may be made without departing from the scope of the present invention.

The contents of the basic Japanese Patent Application No. 10-011689, filed on Jan. 23, 1998, are hereby incorporated by reference.

What is claimed is:

1. A computer application managing method for a case where a plurality of computer applications are stored in a computer-readable storage at locations of the storage, the method comprising:

electronically storing, in the computer-readable storage, a directory structure corresponding to the plurality of applications;

in the computer-readable storage, giving information of the application addresses directly to directories of the directory structure, respectively, the application address information being for identifying the applications, respectively, where the applications are needed for corresponding data files stored in the computer-readable storage using the directories, respectively;

electronically performing management so that when one of the data files is selected a needed application corresponding to the data file of a directory of the directories is automatically selected and executed by referring to the selected data file's directory to obtain its application's address information and therewith access and execute the application at the computer-readable storage location of the thus-obtained address information given to the directory, where the selection for execution is responsive to the data file of the directory being selected;

storing size information at a starting address of each application of the plurality of applications, the size information at a starting address of each application of the plurality of applications; and detecting the size of an application of the plurality of applications from the size information stored in the starting address of the application of the plurality of applications, and searching for a starting address of a next application of the plurality of applications in accordance with the size of the preceding application of the plurality of applications, so as to obtain the starting address of a desired application of the plurality of applications, wherein on of the plurality of applications is needed when one of the data files is selected.

2. The computer application managing method, according to claim 1, further comprising:

preparing an application management table storing the information of the application addresses; and referring to the application management table when a directory of the directories is selected, so as to recognize a starting address of an application of the plurality of applications, the starting address corresponding to an item of the application address information given to the directory of the directories, and to access the application of the plurality of applications.

3. The computer application managing method, according to claim 1, wherein an item of the information of the application addresses is given to the highest directory of the directory structure.

4. The application managing method, according to claim 1, wherein an item of the information of application addresses is given to each directory of the directory structure.

5. The computer application managing method, according to claim 1, wherein, when an application of the plurality of applications is substantially deleted, an item of the information of the application addresses for the application of the plurality of applications is caused to be ineffective.

6. The computer application managing method, according to claim 1, wherein when an application of the plurality of applications is updated, an application obtained from updating the application of the plurality of applications is added to the plurality of applications, and wherein an item of the information of the application addresses for identifying the application of the plurality of applications is changed to an item of identification information for identifying the application obtained from updating the application of the plurality of applications.

7. A method according to claim 1, wherein the directories are predetermined.

8. A method according to claim 1, wherein the computer-readable storage comprises a memory card.

9. A method according to claim 8, wherein the memory card comprises an IC card.

10. An information processing apparatus, comprising:

a processor;

a computer-readable storage storing a plurality of applications at addresses of, the plurality of applications comprising:

a directory structure in the computer-readable storage corresponding to the plurality of applications, wherein in the computer-readable storage information of the application addresses are given directly to directories of the directory structure, respectively, the application address information identifying the applications, respectively, where the applications are needed for corresponding data files, and where the data files are organized and stored in the computer-readable storage using the directories of the directory structure; and a controller performing management so that when one of the data files is selected a needed application corresponding to the data file of a directory of the directories is automatically selected and executed by referring to the selected data file's directory to obtain its application's address information and therewith access and execute the application at the computer-readable storage location of the thus-obtained address information given to the directory, where the selection for execution is responsive to the data file of the directory being selected, storing size information at a starting address of each application of the plurality of applications, the size information at a starting address of each application of the plurality of applications, detecting the size of an application of the plurality of applications from the size information stored in the starting address of the application of the plurality of applications, and searching for a starting address of a next application of the plurality of applications in accordance with the size of the preceding application of the plurality of applications, so as to obtain the starting address of a desired application of the plurality of applications, wherein on of the plurality of applications is needed when one of the data files is selected.

* * * * *

UNITED STATES PATENT AND TRADEMARK OFFICE
CERTIFICATE OF CORRECTION

| | | |
|---|---|---|
| PATENT NO. | : 7,308,433 B1 | Page 1 of 1 |
| APPLICATION NO. | : 09/122740 | |
| DATED | : December 11, 2007 | |
| INVENTOR(S) | : Kazuhiro Tomizawa | |

It is certified that error appears in the above-identified patent and that said Letters Patent is hereby corrected as shown below:

On the title page, item [56]:

Column 1 (U.S. Patent Documents), Line 11, change "711/183" to --711/163--.

First page, Column 2 (Attorney, Agent of Firm), Line 1, change "Stass" to --Staas--.

Column 13, Line 66, change "on" to --one--.

Column 16, Line 5, change "on" to --one--.

Signed and Sealed this

Twentieth Day of May, 2008

JON W. DUDAS
*Director of the United States Patent and Trademark Office*